United States Patent [19]

Burgand

[11] Patent Number: 5,403,394
[45] Date of Patent: Apr. 4, 1995

[54] SELF-LEVELING FLOOR COATING MATERIAL

[76] Inventor: Yves Burgand, 116 Lakeside Dr., Rte. 3, Fort Valley, Ga. 31030

[21] Appl. No.: 202,248

[22] Filed: Feb. 24, 1994

[51] Int. Cl.$^6$ .............................................. C04B 16/00
[52] U.S. Cl. .................................... 106/724; 106/726; 106/727; 106/730; 106/823; 524/35; 524/55; 524/56
[58] Field of Search ............... 106/720, 724, 726, 727, 106/729, 730, 731, 822, 819, 823, 634, 638, 687, 691, 696, 708, 608, 622; 524/6, 35, 55, 56; 536/52, 55.1, 56, 114

[56] References Cited

U.S. PATENT DOCUMENTS 4,316,826  2/1982  Laquerbe et al. .................. 524/6
4,963,668  10/1990  Allen et al. ..................... 536/114

Primary Examiner—Mark L. Bell
Assistant Examiner—Paul Marcantoni
Attorney, Agent, or Firm—Kennedy & Kennedy

[57] ABSTRACT

An additive to cement based materials to render the materials self-leveling upon being mixed with water and applied as a coating upon a floor substrate. The additive comprises a formaldehyde based resin, preferably melamine formaldehyde, and a water retention agent, preferably xanthan gum alone, hydroxyethyl cellulose alone, or a combination thereof.

7 Claims, No Drawings

SELF-LEVELING FLOOR COATING MATERIAL

TECHNICAL FIELD

The present invention relates generally to cement and particularly to self-leveling cementitious coatings for floors.

BACKGROUND OF THE INVENTION

In the construction industry, buildings typically have floors made of concrete. Concrete floors are manufactured from liquid cement mixtures that are poured into molds or forms that frame floors. The cement mixtures cure and harden forming concrete floors. The cured concrete floors must be substantially straight and level prior to applying finish flooring such as tile or carpeting.

The cement mixtures usually comprise cement, sand, and water. The cement mixtures are viscous such that laborers must use trowelling tools to smooth the surfaces of the mixtures once they have been poured. Trowelling tools create rippled surfaces which require additional manual labor for smoothing. The cured concrete floor is typically uneven.

In an effort to reduce the cost of labor and difficulty of leveling poured cement, cementitious materials having a self-leveling or self-smoothing agent are typically applied over uneven concrete floor substrates in a thin coating. Since these thin coatings are self-leveling, they must nevertheless be applied sufficiently thick to fill the depressions in the surface of the uneven concrete floors so that the final, level surface is composed solely of the coatings for uniformity of appearance and texture. These coatings are typically made from cement mixtures which contain casein as the self-leveling agent. Casein is a natural product formed by the precipitation of milk by an acid. On the average it is composed of 95% proteins, 1% fats, 12% water and 3% ash. Casein is a powdered material that is typically added to the cement mixtures while dry. Upon the addition of water and sodium carbonate the cement mixtures becomes self-leveling.

Casein, however, as a self-leveling additive has many drawbacks. It is difficult to use since it does not dissolve easily in water. Sodium carbonate, which facilitates the mixing of casein with water, must be added to the mixtures at the construction site. The aqueous cement mixtures must then set for 10 to 15 minutes prior to application. The presence of the sodium carbonate itself creates problems in that it often causes small holes and craters to appear on top of the level surfaces. Since the concrete floor surfaces must be level and smooth prior to applying any floor coverings, the holes and craters must be sanded away. More labor costs result.

The quality of casein is also inconsistent. As a by-product of milk, its composition varies making quality control difficult to manage. Composition can be affected by the quality of grass consumed by cows, the location in which the cows are raised, and the season of production.

Thus, there exists a need for a self-leveling coating material for floors that alleviates problems associated with those coatings containing casein and yet produces a smooth, level floor surface to facilitate the effective application of floor coverings. Accordingly, it is to the provision of such an improved self-leveling material that the present invention is primarily directed.

SUMMARY OF THE INVENTION

It has now been discovered that the addition of a formaldehyde based resin and a water retention agent to cement based materials renders the materials self-leveling once poured as a mixture with water without the need for any casein. Preferably, the resin is melamine formaldehyde. Preferably, the water retention agent is xanthan gum, hydroxyethyl cellulose, or a combination thereof.

DETAILED DESCRIPTION OF THE INVENTION

Upon the addition of water to a cement based material with the new additive, the material readily liquefies to becomes a self-leveling, cementitious floor coating. The material is applied as a coating over an existing, usually uneven surface of a floor substrate. The coating varies in thickness depending on the unevenness of the floor surface. However, the average thickness is about one-half of an inch. The coating, once dry, produces a substantially level floor surface well suited for the laying and securing of tile or other flooring materials thereon. The coating may be applied not only over concrete floor substrates but also over other common floor substrates such as wood.

The self-leveling additive is preferably a dry mixture of a formaldehyde based resin and a water retention agent. The formaldehyde based resin acts as a liquefier and is preferably melamine formaldehyde. The water retention agent is preferably xanthan gum, a polysaccharide, and/or hydroxyethyl cellulose, a cellulose derivative. The xanthan gum or hydroxyethyl cellulose perform alone or in any combination thereof as the water retention agent.

The self-leveling additive is preferably produced by dry mixing approximately 1 part by weight of the water retention agent in a powdered form with about 17 parts by weight of the formaldehyde based resin in a powdered form. The powdered mixture of the self-leveling additive may vary from between about 0.5 to 1.5 parts by weight water retention agent to about 17 parts by weight of the formaldehyde based resin. When the water retention agent is below 0.5 parts by weight, the coating does not have enough fluidity to flow without tooling assistance at standard room temperature. When the water retention agent is above 1.5 parts by weight, the coating dries too slowly to be of economically feasible, commercial use in the construction industry.

The self-leveling additive is preferably dry mixed with the dry cement based material. The preferred ratio is about 18 parts by weight of the self-leveling additive to about 3000 parts by weight of the cement based material. Self-leveling properties are attainable as low as about 15 parts by weight of the self-leveling additive to about 3000 parts by weight of the cement based material. Though self-leveling properties are attainable above 18 parts by weight of the self-leveling additive to 3000 parts by weight of the cement based material, the addition of more additive does not significantly improve the desired self-leveling properties. Water is added to the mixture at the construction site creating a self-leveling cementitious material for application as a coating to the surface of the floor substrate. Typically, 20 percent by weight water is added to the dry mixture of the cement based materials and self-leveling additive. Upon pouring the material onto the floor surface, the material begins flowing on its own accord to cover the floor surface. A substantially level and straight cementitious coating results which dries in about two to three hours.

It is thus seen that an additive comprising a formaldehyde based resin and a water retention agent for cement based materials is now provided that renders the materials self-leveling once poured as a mixture with water without the need for any casein. While this invention has been described in detail with particular references to the preferred embodiment thereof, it should be understood that many modifications, additions and deletions may be made thereto without departure from the spirit and scope of the invention as set forth in the following claims.

What I claim is:

1. An additive to cementitious materials to render the cementitious materials self-leveling upon being mixed with water and applied as a coating upon a substrate, and with the additive consisting essentially of approximately 17 parts of a formaldehyde resin and approximately 0.5 to 1.5 parts of a water retention agent selected from the group consisting of xanthan gum, hydroxyethyl cellulose, and a combination thereof.

2. The additive of claim 1 wherein said formaldehyde resin is melamine formaldehyde.

3. The additive of claim 1 wherein said formaldehyde resin and water retention agent are in powdered form.

4. The additive of claim 3 wherein said formaldehyde resin is mixed with said water retention agent.

5. A cementitious composition, comprising: an additive consisting essentially of approximate 17 parts of a formaldehyde resin and approximately 0.5 to 1.5 parts of a water retention agent selected from the group consisting of xanthan gum, hydroxyethyl cellulose, and a combination thereof and cementitious materials in a ratio of approximately 15 to 18 parts additive to approximately 3000 parts cementitious materials.

6. The cementitious composition of claim 5 further comprising water of about twenty percent by weight of said additive and said cementitious materials.

7. A self-leveling coating, comprising: a cementitious material; an additive consisting essentially of approximately 17 parts of a formaldehyde resin and approximately 0.5 to 1.5 parts of a water retention agent selected from the group consisting of xanthan gum, hydroxyethyl cellulose, and a combination thereof, and being added to said cementitious materials in a ratio of approximately 15 to 18 parts additive to approximately 3000 parts cementitious materials; and water.

* * * * *